(12) United States Patent
Noishiki et al.

(10) Patent No.: US 6,492,040 B2
(45) Date of Patent: Dec. 10, 2002

(54) WELDING CONSTRUCTION AND HEAT EXCHANGER USING THE WELDING CONSTRUCTION

(75) Inventors: Koji Noishiki, Takasago (JP); Kenichirou Mitsuhashi, Takasago (JP); Shuhei Natani, Takasago (JP); Masahiro Gotou, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/891,308

(22) Filed: Jun. 27, 2001

(65) Prior Publication Data

US 2002/0015857 A1 Feb. 7, 2002

(30) Foreign Application Priority Data

Jun. 28, 2000 (JP) ........................................ 2000-193627

(51) Int. Cl.⁷ ............................ B32B 15/20; F28F 21/08
(52) U.S. Cl. ....................... 428/654; 165/133; 165/186; 165/905; 428/583; 428/594; 428/603; 428/628; 428/629; 428/632; 428/469; 428/471; 428/472.2; 428/926
(58) Field of Search .................................. 428/654, 583, 428/594, 603, 628, 629, 632, 469, 471, 472.2, 926; 165/133, 186, 905

(56) References Cited

U.S. PATENT DOCUMENTS 5,699,855 A * 12/1997 Mitsuhashi ................. 165/133

FOREIGN PATENT DOCUMENTS

JP 08-269680 10/1996

OTHER PUBLICATIONS

Leeper, James, "Mercury Corrosion in Liquefied Natural Gas Plants," Energy Processing/Canada, Jan.–Feb., 1981, pp. 46–51.

(List continued on next page.)

Primary Examiner—Robert R. Koehler

(57) ABSTRACT

To make stress corrosion cracking caused by precipitation of a β layer ($Mg_2Al_3$) in a welding part (5) or in the periphery of the welding part (5) hard to occur. An apparatus body (1) and a header (3) formed of an aluminum alloy with precipitation of magnesium suppressed by standardized heat treatment are assembled and welded, and natural gas containing mercury is subjected to heat exchanging. There are provided with backing metal (4) disposed on the back of the inner wall surface of one header (3) prior to standardized heat treatment and placed in contact with the other apparatus body (1) at the time of assembling and welding, a welding part (5) formed by being assembled and welded using first welding metal containing magnesium at percent content not less than 2.0% in a space part formed by the backing metal (4), the apparatus body (1) and the header (3), and a seal part (6) formed by seal-welding, so that first welding metal may not contact with fluid from a contact part between the backing metal (4) and the apparatus body (1), the contact part using second welding metal containing magnesium at percent content not more than 2.0%.

4 Claims, 3 Drawing Sheets

OTHER PUBLICATIONS

Pickens, J.R. et al., "Embrittlement of P/M X7091 and I/M 7175 aluminium alloys by mercury solutions," Journal of Materials Science 18(1983), pp. 1872–1880 (No Month Given).

Patteson, R.A., "Stress Corrosion Testing of 5083 Aluminum," National Association of Corrosion Engineers, vol. 37, No. 8, Aug., 1981, pp. 455–461.

McIntyre, Dale R. et al., "Mercury Attack of Ethylene Plant Alloys," Corrosion 89, New Orleans Convention Center, New Orleans, Louisiana, Apr. 17–21, 1989, Paper No. 106, pp. 106/1–106/20.

Wilhelm, S. Mark et al., "Methods to Combat Liquid Metal Embrittlement in Cryogenic Aluminum Heat Exchangers," presented at the $73^{rd}$ Annual GPA Convention, Mar. 7–9, 1994, New Orleans, Louisiana, pp. 1–10.

Nelson, David R., "Mercury Attack of Brazed Aluminum Heat Exchangers in Cryogenic Gas Service," presented at the $73^{rd}$ Annual GPA Convention, Mar. 7–9, 1994, New Orleans, Louisiana, pp. 1–6.

* cited by examiner

WELDING CONSTRUCTION AND HEAT EXCHANGER USING THE WELDING CONSTRUCTION

BACKGROUND OF THE INVENTION

1. Field of the Invention

The present invention relates to a welding construction and a heat exchanger provide with the welding construction which are applied, for example, when a heat exchanger or the like for cooling natural gas by heat exchange is assembled.

2. Description of the Related Art

It is desired that for example, equipment such as a heat exchanger, piping, tank and the like introduced into a plant for natural gas processing are formed using an aluminum alloy excellent in mechanical properties and heat transfer in a low temperature service. Particularly, 5083 material defined in the Japanese Industrial Standard is said to be suitable as material for the above-describe equipment since the 5083 material has relatively high strength in a low temperature service among aluminum alloys.

Accordingly, in the past, an aluminum alloy of 5083 material is prepared as a welding object member having a predetermined shape by working such as by extrusion or cutting. In some cases, thereafter, backing. metal is mounted on the wall surface on the side in contact with natural gas, and assembling and welding are done using welding metal formed of 5183 material from on the side of the other wall surface to form a welding part whereby the welding object members are joined through the welding part.

However, in the above-described constitution, it is sometimes that when welding takes place using welding metal, molten welding metal comes in contact with fluid from a clearance between the welding object member and the backing metal. Since the welding metal in contact with fluid is formed of 5083 material containing magnesium at a percentage content of, for example, not less than 2.0%, a large amount of magnesium precipitates in the form of β layer ($Mg_2Al_3$) in the cooling process. Accordingly, there is a problem that when equipment assembled in that state is used for natural gas processing, a thermal influence part caused by welding and much magnesium precipitated in welding metal come in direct contact with natural gas, because of which stress corrosion cracking caused by reaction between magnesium and mercury tends to occur.

SUMMARY OF THE INVENTION

It is therefore an object of the present invention to provide a welding construction and a heat exchanger provided with the welding construction capable of preventing the stress corrosion cracking caused by reaction between magnesium precipitated in welding metal and mercury.

For solving the above-described problem, according to the present invention, there is provided a welding construction for a welding object member applied to a joining part in contact with a processed fluid containing mercury and formed of an aluminum alloy containing magnesium, comprising: backing metal provided on the wall surface on the side with which the processed fluid in the welding object member comes in contact; a welding part formed by assembling and welding using first welding metal formed of an aluminum alloy containing magnesium at not less than a predetermined percentage content in a space part formed by the backing metal and the welding object member; and a seal part formed, so as to prevent the first welding metal from leaking out during assembling and welding from a contact part between the backing metal and the welding object member, by seal-welding the contact part using second welding metal formed of an aluminum alloy containing magnesium at not more than predetermined percentage content.

According to the above-described constitution, the seal part formed in the contact part between the backing metal and the welding object member is able to positively interdict the contact between the first welding metal and the processed fluid. Further, the seal part is formed of the second welding metal which is smaller in percentage content of magnesium than the first welding metal. Thereby, even in the state that when the seal part is formed, the second welding metal in the seal part leaks out on the processed fluid side into contact with the processed fluid, the precipitation amount of magnesium of the second welding metal is less than the first welding metal, thus making it possible to make occurrence of stress corrosion cracking caused by reaction between magnesium and mercury in the processed object hard.

Further, the backing metal is characterized by comprising an aluminum alloy containing magnesium at not more than predetermined percentage content. According to the above-described constitution, even if the backing metal should precipitate magnesium by heating at the time of assembling and welding, the precipitation amount of magnesium is reduced, making it possible to make occurrence of stress corrosion cracking hard.

Furthermore, the backing metal is formed so as to cover a heat affected zone where magnesium is precipitated in the welding object member by heating at the time of assembling and welding, whereby contact between magnesium precipitated in the heat affected zone and the processed fluid can be prevented to enable making occurrence of stress corrosion cracking further hard.

Moreover, the welding construction according to the present invention, since the precipitation of magnesium is suppressed by standardized heat treatment, stress corrosion cracking can be made further hard to occur.

It is desired that the welding object member and the welding part comprise an aluminum alloy containing magnesium at not less than 2.0% of percentage content, and the backing metal and the seal part comprise an aluminum alloy containing magnesium at not more than 2.0% of percentage content.

The aluminum alloy of the welding object member and the welding part can be selected out of various alloys classified as a 5000 system in the Japanese Industrial Standard, and the aluminum alloy of the backing metal and the seal part can be selected out of various alloys classified as 1000, 2000, 3000, 4000, 6000, and 7000 systems in the Japanese Industrial Standard. According to the above-described constitution, since standardized general aluminum alloys can be used for the welding construction, material costs can be reduced.

If the welding construction of the present invention is applied to joining parts of a heat exchanger, piping or tank, stress corrosion cracking in the joining parts of a heat exchanger, piping or tank can be prevented.

For example, there can be mentioned a heat exchanger formed by assembling and welding a header formed of an aluminum alloy in which precipitation of magnesium is suppressed by standardized heat treatment and an apparatus body and for heat exchanging natural gas containing mercury, comprising: backing metal provided on the inner wall surface of the header prior to the standardized heat treatment and placed in contact with the other welding object member at the time of assembling and welding; a welding part formed by the assembling and welding using first welding metal containing magnesium at not less than a predetermined percentage content in a space part formed by the backing metal, the header, and the apparatus body; and a seal part formed, so that the first welding metal does not come into contact with fluid in a contact part between the backing metal and the apparatus body, by seal-welding the contact part using second welding metal containing magnesium at a not more than predetermined percentage content.

According to the above-described constitution, since the seal part formed in the contact part between the backing metal and the apparatus body prevents leaking of the first welding metal at the time of assembling and welding, it is possible to positively prevent the contact between the first welding metal and natural gas. Further, the seal part is formed of the second welding metal which is smaller in percentage content of magnesium than the first welding metal. Thereby, even in the state that when the seal part is formed, the second welding metal of the seal part leaks out on the natural gas side into contact with the natural gas, since the precipitation amount of magnesium of the second welding metal is less than the first welding metal, it is possible to make occurrence of stress corrosion cracking caused by reaction between magnesium and mercury in natural gas hard.

DESCRIPTION OF THE PREFERRED EMBODIMENTS

The preferred embodiments of the present invention will be described hereinafter with reference to FIGS. 1 to 4.

Figure 3:
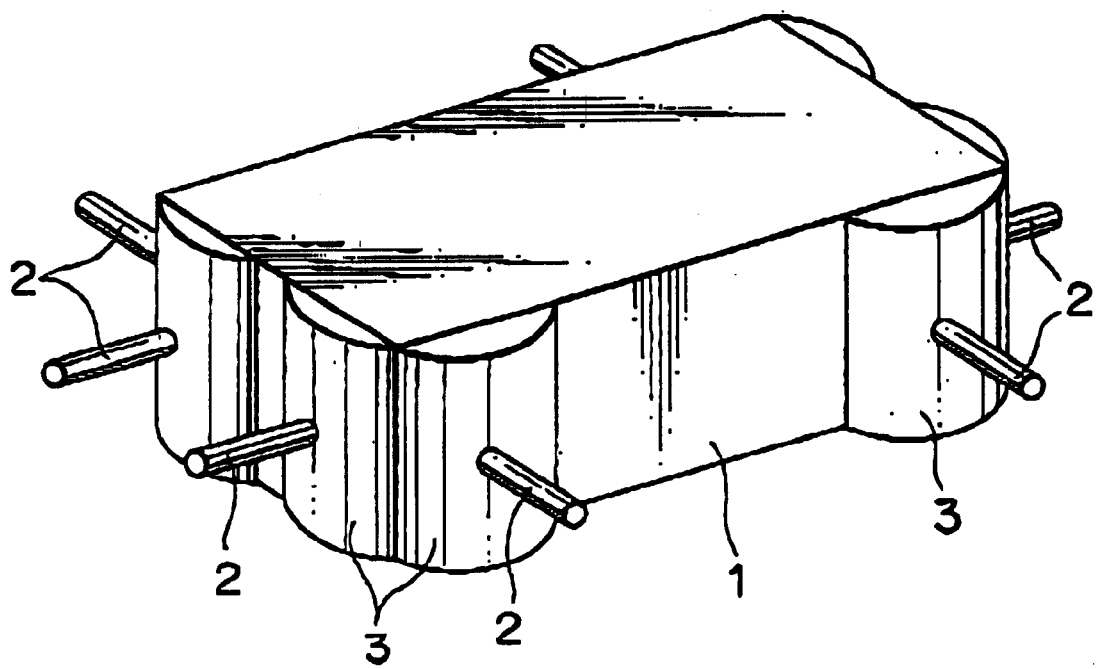
FIG. 3 is a perspective view of a heat exchanger.

A welding construction according to the present invention is applied, for example, to a joining part of a heat exchanger. As shown in FIG. 3, the heat exchanger comprises an apparatus body 1 internally provided with a number of plate fins in a laminated state and for heat exchanging natural gas in the form of liquid or gas, a nozzle 2 for flowing natural gas, coolant or the like to the apparatus body 1, and a header 3 for connecting the nozzle 2 to the apparatus body 1. These members 2 and 3 are formed of an aluminum alloy of 5083 material containing magnesium in a range of from 4.0% to 4.9%, precipitation of a β layer ($Mg_2Al_3$) being suppressed by standardized heat treatment, and having an oxide film formed in the inner wall surface by film forming process so that mercury in natural gas may not be moved therein. It is desired that the film may have a thickness of 20 to 170 $\mu$m so as not to be scraped off easily by a cooled fluid or coolant.

The standardized heat treatment termed herein is a process of heating to 250 to 350° C., and cooling to a normal temperature after holding for 1 to 10 hours to thereby return to a state free from segregation in tissue. The above-described heating temperature, holding time and cooling speed are a mere illustration, and may be suitably changed depending upon the wall-thickness of the nozzle 2 or the header 3.

Further, the film forming process termed herein is a process in which where an oxide film is formed, oxide gas is introduced into the apparatus body 1 or the header 3, inlets and outlets of the whole flowpassage are closed, after which the gas is left for a few hours in the heating atmosphere at a heating furnace whereby an aluminum alloy and oxide components in the oxide gas are reacted to form a film. As the oxide gas, atmospheric gas having 25 to 35% of oxygen concentration or ozone ($O_3$), chlorine gas ($Cl_2$), NOx or the like can be used. In a case where atmospheric gas having 25 to 35% of oxygen concentration is used as the oxide gas, it is desired that a temperature of heating atmosphere is in a range of from 250 to 350° C. so that the aforementioned standardized heat treatment can be carried out simultaneously, and desired that the leaving time (holding time) is about 1 to 10 hours.

Further, the film forming process is a process in which where a film hydroxide is formed, an alkaline aqueous solution at normal temperature is introduced in place of the aforementioned oxide gas, and the alkaline aqueous solution is held for scores of seconds whereby an aluminum alloy and an alkaline component in the alkaline aqueous solution are reacted to form a film. As the alkaline aqueous solution, sodium hydroxide solution (NaOH), potassium hydroxide solution (KOH), calcium hydroxide solution ($Ca(OH)_2$), magnesium hydroxide ($Mg(OH)_2$) or the like can be used. Further, in a case where the sodium hydroxide solution is used for an alkaline aqueous solution, it is desired that sodium hydroxide concentration be in a range of 1 to 7%, and desired that the leaving time (holding time) be about 90 seconds.

Figure 1:
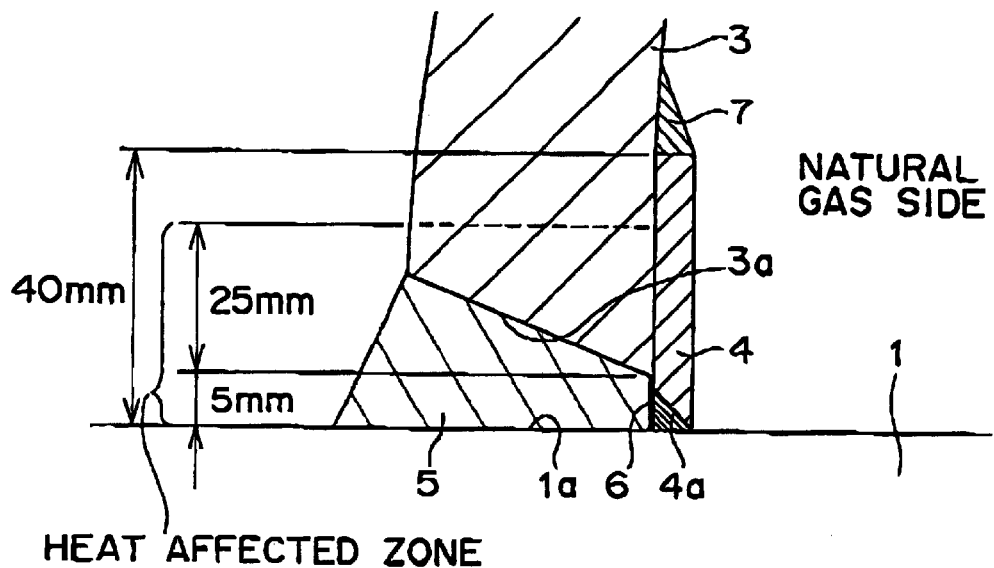
FIG. 1 is an explanatory view showing the state that an apparatus body and a header are joined.

The apparatus body 1 and the header 3 are connected by a joining construction including backing metal 4 and a welding part 5, as shown in FIG. 1. That is, the joining construction comprises a planar mounting surface 1a in the apparatus body 1, a joining surface 3a of the header 3 inclined so as to enlarge a clearance from the inner wall surface side (natural gas side) over the outer wall surface side with respect to the mounting surface 1a, backing part 4 fixedly mounted on the inner wall surface of the header 3, a joining part 7 for joining an upper end of the backing metal 4 to the header 3, a welding part 5 formed in a space part between the backing metal 4 and the respective surfaces 1a, 3a, and a seal part 6 formed in a clearance between the backing metal 4 and the mounting surface 1a so as to prevent welding metal from coming into contact with fluid.

Figure 2:
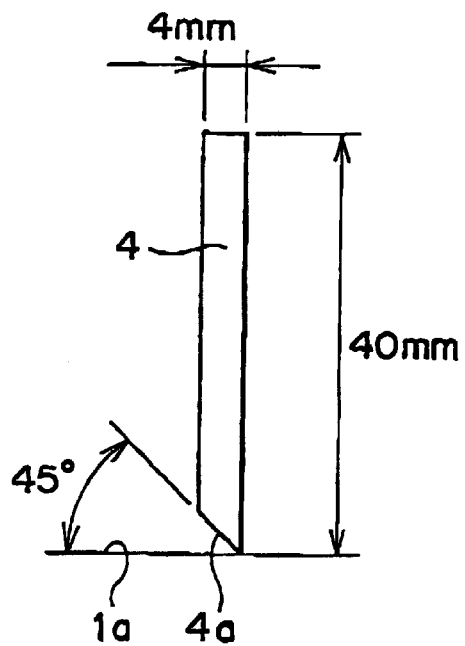
FIG. 2 is an explanatory view showing the state that backing metal is placed in contact with the mounting surface.

The backing metal 4 is formed to have size and shape so as to cover a heat affected zone for re-precipitating the β layer ($Mg_2Al_3$) by heating caused by welding. For example, in a case where the heat affected zone is present in a range to a height position of 30 mm from the mounting surface 1a, size of the backing metal 4 is decided, for example, so as to have the height of 40 mm from the mounting surface 1a so as to enable sufficient covering of the heat affected zone, as shown in FIG. 2. The backing metal 4 is formed of an aluminum alloy of 3003 material not containing magnesium, and even if it is heated to a high temperature state at the time of assembling and welding, the β layer ($Mg_2Al_3$) is not precipitated. Further, the backing metal 4 has a joining surface 4a inclined in the same direction as the joining surface 3a of the header 3, for example, being set to an angle of about 45 degrees.

The aforementioned seal part 6 is formed in the space part formed by the joining surface 4a of the backing metal 4 and the mounting surface 1a, as shown in FIG. 1. The seal part 6 is formed, as shown in FIG. 1, in the space part formed by the joining surface 4a of the backing metal 4 and the mounting surface 1a. The seal part 6 is formed of an aluminum alloy of 4043 material with magnesium of not more than 0.05% to suppress the precipitation of the β layer ($Mg_2Al_3$) to the minimum, and formed by seal welding immediately before the header 3 and the apparatus body 1 are joined. On the other hand, the joining part 7 for fixedly mounting the backing metal 4 to the header 3 is formed by welding prior to the standardized heat treatment or the film forming process, and comprises an aluminum alloy of 4043 material similar to the seal part 6. Further, the welding part 5 is formed by assembling and welding described later, and comprises an aluminum alloy of 5183 material so as to firmly join the header 3 and the apparatus body 1.

In the above-described constitution, the method for manufacturing a heat exchanger and operation will be described below.

First, extruded sections or plates formed from 5083 material and 3003 material are prepared and welding metal from 5183 material and 4043 material are prepared. The extruded sections or plates formed from 5083 material are cut into predetermined size, and molded into a predetermined shape as necessary, and are assembled as the apparatus body 1 internally provided with fins, the nozzle 2, and the header 3, as shown in FIG. 3. Further, as shown in FIG. 1, in the assembling and welding described later, the heat affected zone in which the β layer ($Mg_2Al_3$) is precipitated in the header 3 is obtained on the basis of the welding conditions or the plate-thickness of the header 3, and the backing metal 4 capable of sufficiently covering the heat affected zone (for example, a range of 30 mm from the mounting surface 1a) is cut out from the plate of 3003 material to form the joining surface 4a at an end.

Next, the nozzle 2 and the header 3 are welded by 5183 material. Further, the upper end of the backing metal 4 and the inner wall surface of the header 3 are welded by welding metal comprising 4043 material while placing the backing metal 4 in contact with the inner wall surface of the header 3 so that the joining surface 4a of the backing metal 4 projects downward from the joining surface 3a of the header 3 whereby the backing metal 4 and the header 3 are fixedly mounted in the joining part 7.

Next, the oxide gas is introduced into the welded nozzle 2 and header 3, and is carried, after the inlets and outlets of the whole flowpassage are closed, into a heating furnace. Then, the gas is left for 5 hours in the heating atmosphere, for example, at 300° C. whereby an aluminum alloy and an oxide component in the oxide gas are reacted to form an oxide film (film forming process). Thereafter, when a heating temperature is gently lowered down to 200° C., it is forcibly cooled at cooling speed of 50° C./hr to thereby prevent precipitation of the β layer ($Mg_2Al_3$) (standardized heat treatment).

Thereby, even if the nozzle 2, the header 3 or the welding part by which the nozzle 2 and the header 3 are joined is formed of 5183 material containing relatively much magnesium, the amount of magnesium which precipitates in the form of the β layer ($Mg_2Al_3$) is extremely small, and since the members 2, 3 and the inner wall surface of the welding part are covered with the oxide active film, there appears state that stress corrosion cracking caused by reaction between mercury in the natural gas and magnesium in the members 2, 3 or the welding part is hard to occur. Further, since the joining part 7 for fixedly mounting the backing metal 4 on the header 3 is formed of 4043 material which is small in percentage content of magnesium (not more than 0.05%), there appears state that stress corrosion cracking is still harder to occur. Incidentally, since the backing metal 4 is formed of 3003 material not containing magnesium, the stress corrosion cracking caused by precipitation of the β layer ($Mg_2Al_3$) scarcely occurs.

When the film forming process and the standardized heat treatment with respect to the members 2, 3 have been completed as described above, then the assembling and welding process takes place. That is, the header 3 having the backing metal 4 fixedly mounted thereon is located so that the extreme end of the joining surface 4a of the backing metal 4 comes into contact with the mounting surface 1a of the apparatus body 1. Then, seal welding using welding metal of 4043 material is applied to the space part formed by the joining surface 4a of the backing metal 4 and the mounting surface 1a to thereby form a seal part 6 comprising 4043 material. Since in this time, welding metal of 4043 material which is small in percentage content of magnesium, even if welding metal of the seal part 6 comes in contact with fluid from a clearance between the joining surface 4a and the mounting surface 1a when the seal part 6 is formed, danger of stress corrosion cracking caused by precipitation of the β layer ($Mg_2Al_3$) is extremely small as compared with the case where 5083 material leaks out.

Thereafter, assembling and welding using welding metal of 5183 material is carried out with respect to the space part formed by the mounting surface 1a of the apparatus body 1, the joining surface 3a of the header 3, the backing metal 4 and the seal part 6 to thereby form a welding part 5 comprising 5183 material. Since at this time, a part of heat at the time of welding is transmitted to the header 3 to heat the heat affected zone to a high temperature, the β layer ($Mg_2Al_3$) sometimes precipitates in the heat affected zone. However, since the backing metal 4 is formed and provided so as to cover the heat affected zone, magnesium of the β layer ($Mg_2Al_3$) re-precipitated in the heat affected zone does not come in contact with the natural gas directly. Further, in the assembling and welding, the backing metal 4 is also heated to a high temperature about the same as the heat affected zone, but since 3003 material constituting the backing metal 4 contains no magnesium, the β layer ($Mg_2Al_3$) is not precipitated. Further, the clearance between the joining surface 4a of the backing metal 4 and the mounting surface 1a is completely blocked by the seal part 6, welding metal comprising 5183 material will not come in contact with the natural gas at the time of welding.

Thereby, even if the β layer ($Mg_2Al_3$) should be precipitated on the welding part 5 and the header 3 by the assembling and welding process, the contact between the β layer ($Mg_2Al_3$) and the natural gas is sufficiently prevented by the backing metal 4 or the like. As a result, even if the heat exchanger is introduced into the liquefied natural gas producing plant to apply heat exchange to the natural gas containing mercury, occurrence of stress corrosion cracking in the welding part 5 or in the periphery of the welding part 5 is to be prevented sufficiently.

As described above, a welding construction for a welding object member applied to a joining part in contact with natural gas (a processed fluid) containing mercury and formed of an aluminum alloy containing magnesium, comprising: backing metal 4 provided on the wall surface on the side with which the processed fluid in the welding object member comes in contact; a welding part 5 formed by assembling and welding using first welding metal formed of an aluminum alloy containing magnesium at not less than a predetermined percentage content (percentage content of not less than 2.0%) in a space part formed by the backing metal 4 and the welding object member; and a seal part 6 formed, so as to prevent the first welding metal from leaking out during assembling and welding from a contact part between the backing metal 4 and the welding object member, by seal-welding the contact part using second welding metal formed of an aluminum alloy containing magnesium at not more than predetermined percentage content percentage content of not more than 2.0%).

Concretely, the welding construction in the present embodiment is applied to a joining part of a heat exchanger. The heat exchanger is formed by assembling and welding a nozzle 2 (a welding object member) and a header 3 (a welding object member) formed of an aluminum alloy with precipitation of magnesium suppressed by standardized heat treatment on the apparatus body 1 to carry out heat exchange with respect to natural gas (object to be processed) containing mercury, comprising backing metal 4 provided on the inner wall surface of one header 3 prior to standardized heat treatment and placed in contact with the other apparatus body 1 at the time of assembling and welding, a welding part 5 formed by assembling and welding using first welding metal formed of an aluminum alloy containing magnesium at not less than a predetermined percentage content (percentage content of not less than 2.0%) in a space part formed by the backing metal 4, the apparatus body 1 and the header 3, and a seal part 6 formed, so as to prevent the first welding metal from leaking out during assembling and welding from a contact part between the backing metal 4 and the welding object member, by seal-welding the contact part using second welding metal formed of an aluminum alloy containing magnesium at not more than predetermined percentage content (percentage content of not more than 2.0%).

While in the welding construction according to the present embodiment, the standardized heat treatment and the film forming process prior to the assembling and welding, it is noted that they may be carried out as necessary on the basis of the precipitating state of the β layer ($Mg_2Al_3$), or one of the processes may be done, or both the processes may not be done. Further, while a description has been made of the case where the welding construction in the present embodiment is applied to the joining part of a heat exchanger for heat-exchanging natural gas, it is noted that application thereof is not limited thereto. That is, this can be applied to all the liquid or powdery fluid containing mercury, and processed objects containing these fluids and solids. Accordingly, the welding construction in the present embodiment can be also applied to joining parts of equipment such as a heat exchanger, tanks, piping or the like introduced into various plants such as an ethylene producing plant and an ammonia producing plant or the like in addition to a liquefied natural gas producing plant.

Figure 4:
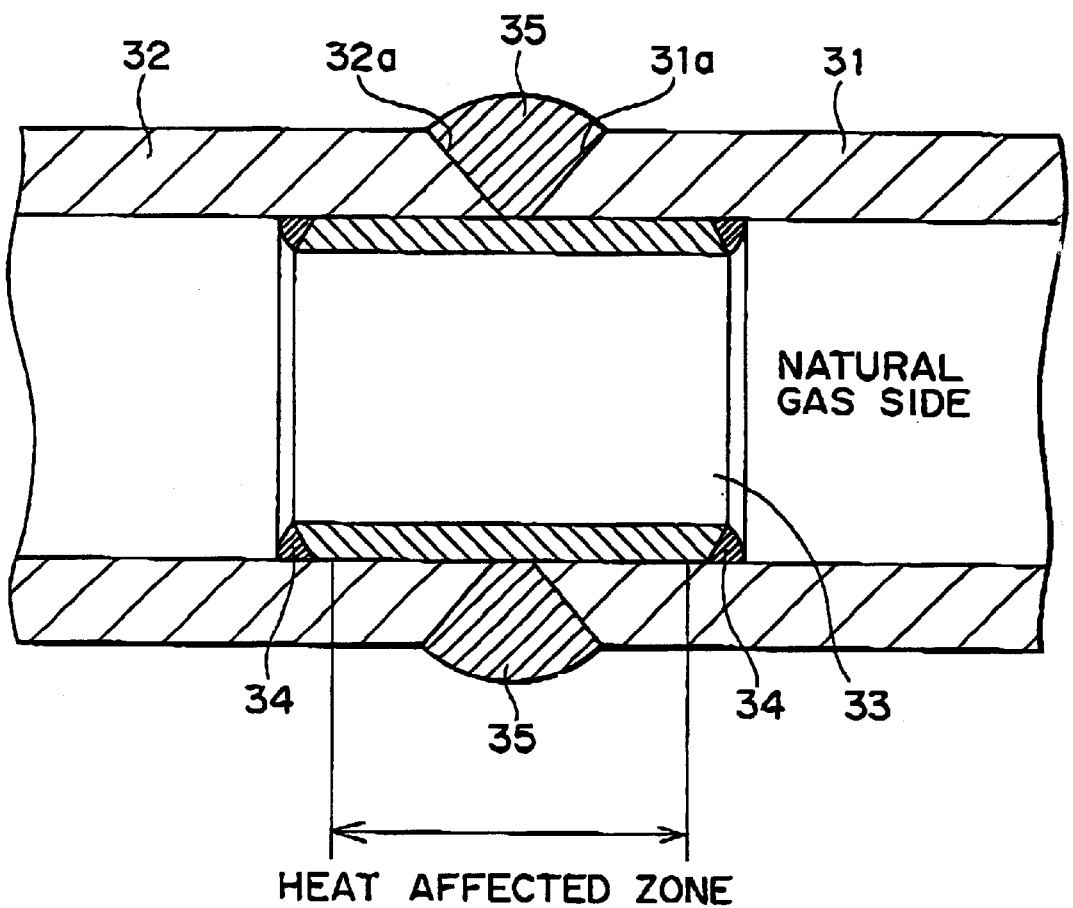
FIG. 4 is an explanatory view showing the state that cylindrical members are joined together.

Concretely explaining, as shown in FIG. 4, first, a material comprising an aluminum alloy such as 5083 material containing magnesium at not less than predetermined percentage content (percentage content not less than 2.0%) is prepared, and this material is worked to thereby prepare a first cylindrical member 31 (a welding object member) and a second cylindrical member 32 (a welding object member) constituting a body portion of a tank or a part of piping.

Further, a material comprising an aluminum alloy such as 3003 material containing magnesium at not more than predetermined percentage content percentage content not more than 2.0%) is prepared, and this material is worked to thereby prepare annulus backing metal 33. The backing metal 33 is set to a length that can cover a heat affected zone in which the β layer ($Mg_2Al_2$) is precipitated to the cylindrical members 31, 32, and set to an outer circumferential diameter in which the outer circumferential surface comes in contact with the inner wall surface on the natural gas side of the cylindrical members 31, 32.

Thereafter, extreme ends 31a, 32a of both the cylindrical members 31, 32 are butted at predetermined intervals, after which the backing metal 33 is inserted into both the cylindrical members 31, 32. Then, the backing metal 33 is located so that both ends of the backing metal 33 are present at a symmetrical position from a center position of butting.

Next, second welding metal such as 4043 material containing magnesium not more than a predetermine percentage content (percentage content not more than 2.0%) is prepared. Then, the whole contact part between the extreme ends 31a, 32a of the backing metal 33 and the inner wall surface of the cylindrical members 31, 32 is seal-welded by the second welding metal to thereby form a seal part 34 in the whole contact part.

Thereafter, the precipitation of the β layer ($Mg_2Al_3$) is suppressed by the standardized heat treatment, or a film is formed on the inner wall surface by the film forming process, as necessary. Then, the first welding metal such as 5183 material containing magnesium at not less than predetermined percentage content (percentage content not less than 2.0%) is prepared, and a space part formed by the extreme ends 31a, 32a of both the cylindrical members 32, 31 and the backing metal 33 is assembled and welded by the first welding metal. Thereby, a welding part 35 is formed in the space part, and the first cylindrical member 31 and the second cylindrical member 32 are joined through the welding part 35 to thereby complete the welding construction in a joining part of a tank or piping.

In the welding construction completed through the aforementioned producing process, when at the time of assembling and welding for forming the welding part 35 by the first welding metal, even if the first welding metal in the molten state is moved into the clearance between the backing metal 33 and the cylindrical members 31, 32, the whole both ends of the backing metal 33 is in the state sealed by the seal part 34, thus not coming into contact with the fluid from both ends of the backing metal 33. Thereby, even if the first welding metal is cooled to precipitate the β layer ($Mg_2Al_3$), occurrence of stress corrosion cracking is prevented because not directly contacting with mercury in natural gas.

Further, when at the time of assembling and welding, both the cylindrical members 31, 31 are heated by heat transfer from the welding part 35, the β layer ($Mg_2Al_3$) is precipitated to the heat affected zone of both the cylindrical members 31, 31. However, since the backing metal 33 is formed and provided so as to cover the heat affected zone, magnesium of the β layer ($Mg_2Al_3$) precipitated in the heat affected zone is not in direct contact with natural gas. Further, in the assembling and welding, the backing metal 33 is also heated to a high temperature of the same degree as the heat affected zone, but 3003 material constituting the backing metal 4 contains no magnesium, and therefore, the β layer ($Mg_2Al_3$) is not precipitated.

In the welding construction in the present embodiment, the apparatus body 1, the header 3, the cylindrical members 31, 32 and the welding parts 5, 35 which are welding object members can be formed of all aluminum alloys containing magnesium of not less than predetermined percentage content (percentage content not less than 2.0%). Concretely, they can be formed by selecting materials out of aluminum alloys of 5052 material, 5652 material, 5154 material, 5254 material, 5454 material, 5056 material, 5082 material, 5282 material, 5083 material, and 5086 material classified as 5000 system in the Japanese Industrial Standard.

Further, the backing metal 4, 33 and the seal parts 6, 34 can be formed by all aluminum alloys containing magnesium at not more than predetermined percentage content (percentage content not more than 2.0%). That is, the backing metal 4, 33 and the seal parts 6, 34 can be selected out of various alloys classified as 1000 system, 2000 system, 3000 system, 4000 system, 6000 system, 7000 system in the Japanese Industrial Standard.

The 1000 system includes IN99 material, IN90 material, 1085 material, 1080 material, 1070 material, 1060 material, 1050 material, 1230 material, IN30 material, 1100 material, 1200 material, and IN00 material. The 2000 system includes 2011 material, 2014 material, 2017 material, 2117 material, 2018 material, 2218 material, 2618 material, 2219 material, 2024 material, 2025 material, and 2N01. The 3000 system includes 3003 material, 3203 material, 3004 material, 3104 material, 3005 material, 3105 material, and the like. The 4000 system includes 4032 material and the like. The 6000 system includes 6101 material, 6003 material, 6151 material, 6061 material, 6N01 material, 6063 material and the like. The 7000 system includes 7003 material, 7N01 material, 7050 material, 7072 material and the like.

The U.S. Standards, ASME (American Society of Mechanical Engineers) and ASTM (American Society for Testing and Materials) corresponding to the above-described Japanese Industrial Standards are shown in Table 1.

TABLE 1

| | Standards | | |
|---|---|---|---|
| | Japanese Industrial Standards | ASME | ASTM |
| 1000 | 1N99 | 1060 | 1060 |
| | 1N90 | 1100 | 1100 |
| | 1085 | | 1230 |
| | 1080 | | |
| | 1070 | | |
| | 1060 | | |
| | 1050 | | |
| | 1230 | | |
| | 1N30 | | |
| | 1100 | | |
| | 1200 | | |
| | 1N00 | | |
| 2000 | 2011 | | 2024 |
| | 2014 | | 2124 |
| | 2017 | | 2216 |
| | 2117 | | |
| | 2018 | | |
| | 2218 | | |
| | 2618 | | |
| | 2219 | | |
| | 2024 | | |
| | 2025 | | |
| | 2N01 | | |
| 3000 | 3003 | 3003 | 3003 |
| | 3203 | 3004 | 3004 |
| | 3004 | | 3005 |
| | 3104 | | 3105 |
| | 3005 | | |
| | 3105 | | |
| 4000 | 4032 | | |
| 5000 | 5052 | 5052 | 5052 |
| | 5652 | 5083 | 5083 |
| | 5154 | 5086 | 5086 |
| | 5254 | 5154 | 5154 |
| | 5454 | 5254 | 5252 |
| | 5056 | 5454 | 5254 |
| | 5082 | 5456 | 5454 |
| | 5182 | 5652 | 5456 |
| | 5083 | | 5652 |
| | 5086 | | |
| 6000 | 6000 | | |
| | 6101 | | |
| | 6003 | | |
| | 6151 | | |
| | 6061 | | |
| | 6N01 | | |
| | 6063 | | |
| 7000 | 7003 | 7072 | 7008 |
| | 7N01 | | 7011 |
| | 7050 | | 7072 |
| | 7072 | | |

What is claimed is:

1. A welding construction including:
   welding object members joined to each other by welding, at least one of which is formed of an aluminum alloy containing magnesium;
   a welding part formed of an aluminum alloy containing magnesium for welding a joining portion of said welding object members;
   backing metal disposed on the back of said joining portion and formed of an aluminum alloy having a percent content not more than a percent content of magnesium of said welding part; and
   a seal welding part formed of an aluminum alloy having a percent content not more than a percent content of magnesium of said welding part, for seal-welding said welding object members and said backing metal.

2. The welding construction according to claim 1 wherein a magnesium percent content of said backing metal and said seal welding part is not more than 2.0 weight %.

3. The welding construction according to claim 1 wherein at least a part of the surface of said welding object members and/or said backing metal is formed with an oxide film having a thickness of 20 to 170 µm.

4. A heat exchanger including:
   a header and a heat exchanger body joined to each other by welding, at least one of which is formed of an aluminum alloy containing magnesium;
   a welding part formed of an aluminum alloy containing magnesium for welding a joining portion of said header and said heat exchanger body;
   backing metal disposed on the back of said joining portion and formed of an aluminum alloy having a percent content not more than a percent content of magnesium of said welding part; and
   a seal welding part formed of an aluminum alloy having a percent content not more than a percent content of magnesium of said welding part, for seal-welding said heat exchanger body and said backing metal, and said header and said backing metal, respectively.

* * * * *